US011566699B2

(12) United States Patent
Hasel

(10) Patent No.: US 11,566,699 B2
(45) Date of Patent: Jan. 31, 2023

(54) METHOD FOR SUPPLYING CONSUMERS OF AN OIL SUPPLY SYSTEM FOR A VEHICLE TRANSMISSION WITH OIL

(71) Applicant: ZF Friedrichshafen AG, Friedrichshafen (DE)

(72) Inventor: Mario Hasel, Wangen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 499 days.

(21) Appl. No.: 16/815,346

(22) Filed: Mar. 11, 2020

(65) Prior Publication Data

US 2020/0292052 A1 Sep. 17, 2020

(30) Foreign Application Priority Data

Mar. 11, 2019 (DE) ...................... 10 2019 203 239.7

(51) Int. Cl.
*F16H 57/04* (2010.01)
*F16H 61/00* (2006.01)

(52) U.S. Cl.
CPC ..... *F16H 57/0435* (2013.01); *F16H 57/0439* (2013.01); *F16H 57/0473* (2013.01);
(Continued)

(58) Field of Classification Search
CPC ............. F16H 57/0435; F16H 57/0439; F16H 57/0473; F16H 57/0476; F16H 57/0446; F16H 61/0028; F16H 2061/0037
See application file for complete search history.

(56) References Cited

U.S. PATENT DOCUMENTS 5,133,188 A 7/1992 Okada
8,714,942 B2 * 5/2014 Lutoslawski ........... F04C 14/08
417/319

(Continued)

FOREIGN PATENT DOCUMENTS

CN 101209664 A 7/2008
CN 102459844 A 5/2012
(Continued)

OTHER PUBLICATIONS

DE10329215—machine translation (Year: 2003).*
(Continued)

*Primary Examiner* — Michael A Riegelman
(74) *Attorney, Agent, or Firm* — Dority & Manning, P.A.

(57) ABSTRACT

An oil supply system for a vehicle transmission includes a pump drivable by two drive sources, and a hydraulic control unit including multiple control valves for distributing oil to consumers of the oil supply system. The drive power of the two drive sources are combined by a planetary gear set having an element connected to a pump drive shaft of the pump. A method for supplying the consumers of the oil supply system includes determining an overall oil flow requirement in the oil supply system and an oil flow requirement of consumers in an oil supply circuit of the transmission. The method further includes calculating a drive parameter for at least one of the two drive sources based at least in part on the oil flow requirements. Additionally, the method includes outputting the drive parameter as a specified value for controlling the at least one of the two drive sources.

16 Claims, 2 Drawing Sheets

(52) U.S. Cl.
CPC ..... *F16H 57/0476* (2013.01); *F16H 61/0028* (2013.01); *F16H 2061/0037* (2013.01)

(56) References Cited

U.S. PATENT DOCUMENTS

| | | | |
|---|---|---|---|
| 9,651,143 | B2 | 5/2017 | Schenker et al. |
| 10,288,162 | B2* | 5/2019 | Terwart ............... F16H 57/0446 |
| 10,815,991 | B2* | 10/2020 | Kowalski ............... F04C 15/008 |
| 2016/0137050 | A1* | 5/2016 | Nishimine ............ B60W 10/08 |
| | | | 903/910 |
| 2017/0314670 | A1 | 11/2017 | Handrich et al. |
| 2018/0051795 | A1* | 2/2018 | Terwart ............... F16H 57/0417 |
| 2020/0292052 | A1* | 9/2020 | Hasel .................. F16H 57/0476 |
| 2021/0140433 | A1* | 5/2021 | Humer .................... F04B 17/03 |

FOREIGN PATENT DOCUMENTS

| | | | | |
|---|---|---|---|---|
| CN | 102705492 | A | 10/2012 | |
| CN | 107002863 | A | 8/2017 | |
| CN | 206485199 | U | 9/2017 | |
| DE | 10329215 | A1 | 1/2005 | |
| DE | 102008041402 | A1 | 2/2010 | |
| DE | 102013214758 | A1 * | 1/2015 | ............ B60W 10/30 |
| DE | 102015005344 | A1 * | 11/2016 | ............... F01M 1/02 |
| DE | 102016216765 | A1 | 6/2017 | |
| DE | 102016215225 | A1 | 2/2018 | |
| DE | 102018101082 | A1 * | 7/2019 | |
| EP | 2497665 | A2 * | 9/2012 | ............... B60K 6/48 |
| JP | H0396622 | A | 4/1991 | |
| WO | WO 2010/142042 | | 12/2010 | |
| WO | WO 2010/142042 | A1 | 12/2010 | |
| WO | WO 2016/087146 | A1 | 6/2016 | |
| WO | WO 2018/042044 | | 3/2018 | |

OTHER PUBLICATIONS

German Search Report DE102019203239.7, dated Feb. 28, 2020. (12 pages).
Chinese Office Action (with English translation) 202010164241.5, dated Jul. 18, 2022. (9 pages).

* cited by examiner

METHOD FOR SUPPLYING CONSUMERS OF AN OIL SUPPLY SYSTEM FOR A VEHICLE TRANSMISSION WITH OIL

CROSS-REFERENCE TO RELATED APPLICATION

The present application is related and has right of priority to German Patent Application No. 10 2019 203 239.7 filed on Mar. 11, 2019, the entirety of which is incorporated by reference for all purposes.

FIELD OF THE INVENTION

The present invention relates generally to a method for supplying consumers of an oil supply system for a vehicle transmission with oil. The invention further relates generally to an oil supply system having a control device for carrying out such a method, and to a vehicle transmission having such an oil supply system.

BACKGROUND

The oil supply of a transmission system has considerable potential to increase the efficiency and, therefore, directly associated therewith, the fuel consumption and the emissions. The power consumption of the oil supply and/or the pump system is determined on the basis of the pressure of the pump to be delivered and the volumetric output flow. In the transmission system, the necessary pressure is derived directly from the supporting factors of the various gears and the clutch friction values.

In numerous transmission systems, the rotational speed of the oil pump is fixedly predefined due to the design of the oil pump. As a result, in most operating situations, considerably more oil flow is delivered with respect to the necessary system pressure than is needed and, therefore, a high power loss occurs.

In German patent application DE 10 2008 041 402 A1, an auxiliary hydraulic pump is provided, which is utilized in vehicles having a hybrid drive only when the main pump cannot cover the demand. In international patent application WO 2010/142042 A1, an improved pump system is presented, which is operable by two different drives.

An object of this invention is to provide an improved oil supply system and an appropriate method.

SUMMARY OF THE INVENTION

In order to achieve a higher efficiency, it is advantageous to utilize a pump that is actuatable according to demand. Such a pump system offers the possibility to adapt the oil supply of consumers depending on the current oil demand. This actuation according to demand requires, however, that the flow requirement of oil be known at any given time. This is achieved according to the invention by determining the overall flow requirement of the oil supply system at any given time using detailed demand models, as described in the following. This means, a determination of the flow requirement of oil takes place at predefined time intervals, so that an adaptation according to demand continuously takes place.

The invention therefore provides a method for supplying consumers of an oil supply system for a vehicle transmission with oil, wherein the oil supply system has a pump and a hydraulic control unit including multiple control valves, which distribute the oil to the consumers. The pump is drivable by two drive sources, the drive power of which are combinable via a planetary gear set, wherein an element of the planetary gear set is connected to a pump drive shaft of the pump. Moreover, the pump is configured for delivering the oil to the hydraulic control unit according to demand, wherein the determination of the delivery according to demand takes place using a control unit according to the following steps: determining the overall flow requirement of oil in the oil supply system based in part on the flow requirement of oil of consumers in an oil supply circuit of the vehicle transmission at any given time and, on the basis thereof, carrying out a calculation of a drive parameter to be provided for at least one of the drive sources of the pump, and outputting the determined drive parameter as a specified value for controlling at least one of the drive sources.

Due to a distribution of the flow of oil within the oil supply system of the vehicle transmission, according to demand, the power loss arising due to a permanently high flow of oil and resultant pressure in the system are minimized without risking damage of the consumers or reduced comfort during operation of the vehicle having the transmission due to undersaturation with oil.

The drive parameter preferably characterizes available power, the available rotational speed, or the available torque from at least one of the drive sources. Characterizing by the available rotational speed is particularly advantageous, since a flow rate of the pump is directly dependent on the pump speed.

In some embodiments, the control device is the transmission control unit, since generally all signals and data necessary for the open-loop or closed-loop control converge in the transmission control unit, in order to be processed. The control device is connected to the drive sources as well as to the pump, in order to control the oil distribution by an open-loop or closed-loop system. Alternatively, the control device is a control unit of one of the drive sources.

The pump delivers oil into the hydraulic control unit, which distributes the delivered oil via control valves, according to demand, to the consumers of the primary oil supply circuit or the secondary oil supply circuit. In the process, the primary oil supply circuit is prioritized, i.e., the oil feed to the secondary oil supply circuit is released by the hydraulic control unit only when the oil demand of the primary oil supply circuit is covered. It is therefore ensured that the primary oil supply circuit always has a sufficient oil supply, so that the consumers are protected against wear or destruction. The primary oil supply circuit and the secondary oil supply circuit have different pressures and are individually actuated. The actuation takes place via a prioritization valve, i.e., first, the primary oil supply circuit is supplied with oil and only when its demand has been met is the secondary oil supply circuit supplied with oil. If there is an excess amount of oil remaining, it is returned to the suction side of the pump via a so-called suction charging. The primary oil supply circuit is a hydraulic circuit that ensures the basic supply of the most important transmission components, which are also referred to in the following as consumers. The consumers of the primary oil supply circuit are, in particular, consumers that have oil demands related to clutches, oil demands related to a torque converter, oil demands related to a parking lock system, and oil demands of the hydraulic control unit. The term "clutches" encompasses all possible shift elements in the transmission, i.e., also, for example, a torque converter clutch or TCC, a possibly present separating clutch for the engageable disconnection of the internal combustion engine from the transmission, or engageable brakes.

In one embodiment, the flow requirement of oil of consumers in a secondary oil supply circuit of the vehicle transmission is additionally determined at any given time.

The secondary oil supply circuit is essentially a cooling and lubrication circuit, wherein secondary oil demands of the hydraulic control unit, which are subjected to other pressure conditions, are also handled in this circuit. Various consumers that have a demand for oil are also present here. The consumers of the secondary oil supply circuit are consumers such as the cooling unit itself, but also a cooling of at least one of the clutches, a passive cooling of at least one of the clutches and/or a cooling of an electric motor in the vehicle transmission, which are supplied by the cooling unit, as well as a clutch pre-filling device and a temperature measurement point, which belong to a secondary basic demand of the hydraulic control unit, and a cooling of the torque converter. The cooling of at least one of the clutches is carried out as passive cooling of the clutch in the same branch as the cooling and lubrication of the gear set, or as cooling of a clutch in a separate branch.

In one embodiment, the flow requirement of oil consists of a permanent demand and a situational demand of the consumers depending on the current transmission condition, i.e., on a power demand on the vehicle transmission, for example, due to a drive request. The permanent demand, in this case, is a demand due to a leakage of valves. Since the valves should have the greatest possible ease of movement, a seal is generally not utilized, which results in leaks due to the minimally existing or remaining annular gap. Even if these leaks are very small, a certain demand nevertheless exists, which is to be taken into account in the determination of the overall flow requirement. Due to the sustained system pressure, the hydraulic control unit also has permanent leaks, which are to be taken into account. The situational demand is a demand of individual consumers resulting from the current demand on the transmission. Examples of situational demands for flow are listed in the following, wherein this list is not exhaustive. Rather, flow requirements of other components necessary for other transmission designs or for additional components are also taken into account in the calculation.

In the primary oil supply circuit, the situational demands may include, but are not limited to:
  basic flow requirement of the hydraulic control unit to cover the basic leakage of the hydraulic control unit,
  leakage flow of the parking lock actuator,
  oil demand for displacing the parking lock actuator,
  leakage flow of the shift elements in the transmission, i.e., for example, the clutch(es),
  demand for filling the shift elements in the transmission, i.e., for example, the clutch(es),
  oil demand resulting from capacity or elasticity of the clutch(es),
  oil demand of the torque converter, in particular when the converter clutch is disengaged.

In the secondary oil supply circuit, the situational demands may include, but are not limited to:
  oil demand for transmission lubrication,
  oil demand for transmission cooling,
  oil demand for cooling the electric machine,
  oil demand for pre-filling the clutches,
  oil demand of the temperature measurement point,
  oil demand of the cooling unit,
  oil demand for converter cooling and/or for cooling the torque converter.

Outside the primary or secondary oil supply circuit, the situational demands may include, but are not limited to:
  leakage flow of the pump.

In addition, situational leaks additionally occur at different components, for example, due to pressure and temperature fluctuations in the system.

In one embodiment, the currently necessary drive parameter to be made available is output as an input speed of the pump. Advantageously, in addition to the input speed of the pump, the necessary torque of at least one of the drive sources of the pump is calculated and is utilized as a pre-control variable for the specified value control of the input speed. Since the input speed is approximately proportional to the flow rate, a relatively simple actuation takes place by specifying the input speed to the drive sources of the pump, in order to set the desired flow rate. In order to refine the actuation, the necessary torques of the drive sources of the pump are calculated, by a further calculation and utilized as a pre-control variable. Possible drive sources of the power-split pump are the internal combustion engine, a possibly present electric motor or an electric machine, which is provided for driving the transmission, or an additional electric motor or an electric machine, which is provided specifically for driving the pump.

In one embodiment, a predefined flow is added to the determined flow requirement and, on the basis thereof, the drive parameter to be made available is determined. In order to make it possible to provide the demanded flow as quickly as possible in the case of a requirement involving an abrupt or very high change of the flow, the precisely calculated value of the drive parameter is not set. Rather, a higher value, which is also referred to as flow correction, is set. This means, a further value is added to the calculated value, so that the pump provides a slightly higher flow than was calculated. This additional value is selected or specified by the control unit depending on the current operating condition and predicted demands.

In one embodiment, the control unit is configured for predictively determining the flow requirement of oil. The determination should take place preferably for the overall demand of the oil supply system. It is particularly important for the demand in the primary oil supply circuit, however. A predictive determination is advantageous, in order to provide a flow required in the future in a timely manner, i.e., preferably at the point in time at which the demand actually must be met. For example, a gear change operation is predictable. Every gear change operation requires a clutch actuation. In order to actuate the clutch, the clutch must be filled, for the purpose of which a very high flow rate of, for example, 10 liters per minute, is required in the primary oil supply circuit. This flow rate is not instantaneously providable, and so, without a prediction, a delay would result during shifting, since the necessary oil pressure or flow for filling the clutch must first be made available in the primary oil supply circuit.

In one embodiment, in the case that a requirement to increase the necessary flow rate, due to a request to change or activate a functionality, must be met but was not predictively determined, the functionality is activated only when the oil supply required therefore has been made available. Such a requirement includes, for example, a non-predictable shift request, for example, when the driver manually selects gears. A demand for a gearchange always requires a filling of the clutch, as mentioned above. This requires a high flow rate of oil, which, due to physical conditions, requires a certain amount of time to provide. If this volumetric flow rate is not available, however, then, in this embodiment, the function, i.e., for example, the shift into another gear, is not activated, since there would be a risk that the primary oil supply circuit becomes undersaturated or undersupplied and, therefore, a risk to the consumers and/or components is possible.

In one embodiment, a leakage of the pump is additionally determined and is taken into account in the calculation of the necessary drive parameter. Since the pump also has a certain demand for oil, this demand is also incorporated into the calculation of the necessary flow rate.

Furthermore, an oil supply system is provided for supplying consumers in a vehicle transmission, in order to distribute oil to the consumers according to demand, wherein the oil supply system has a control device, which is configured for carrying out the described method.

In addition, a vehicle transmission for a motor vehicle drive train having the described oil supply system is made available.

Further features and advantages of the invention result from the following description of exemplary embodiments of the invention, on the basis of the figures of the drawing, which shows details according to the invention, and from the claims. The individual features are implementable alone or in arbitrary combination in a variant of the invention.

BRIEF DESCRIPTION OF THE DRAWINGS

Preferred embodiments of the invention are described in greater detail in the following with reference to the attached drawing.

DETAILED DESCRIPTION

Figure 1:
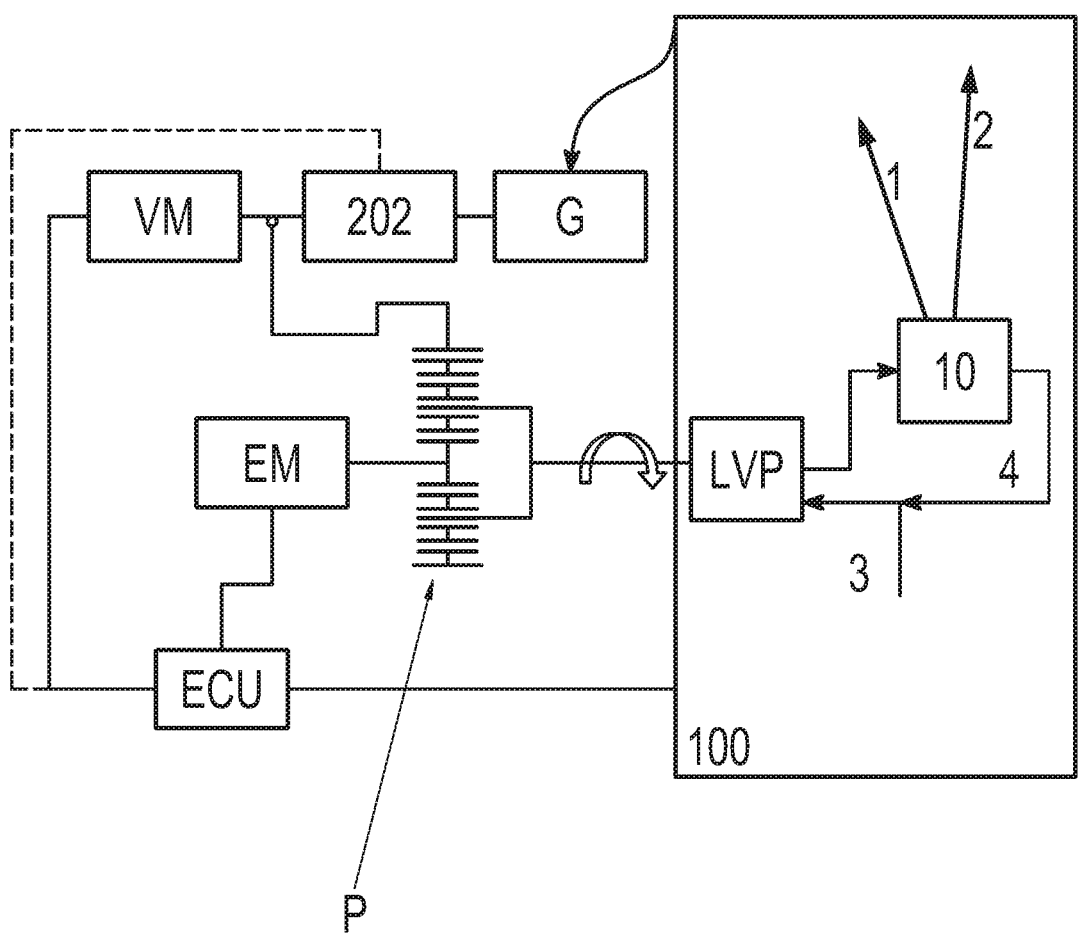
FIG. 1 shows a schematic view of important components of an oil supply system for carrying out the method according to one embodiment of the present invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of important components of an oil supply system for carrying out the disclosed method. The oil supply system 100 has a pump LVP and a hydraulic control unit 10 including multiple control valves in order to supply consumers of the oil supply system 100 for a vehicle transmission G with oil. The control valves of the hydraulic control unit 10 distribute the oil made available by the pump LVP to the consumers via a suction intake 3. The pump LVP is drivable by two drive sources including a first drive source and a second drive source. The first drive source is a transmission-side drive source, and is an internal combustion engine VM, an electric motor 202, or a combination thereof. The second drive source is a pump-side drive source for driving the pump LVP and is an electric motor EM. The drive power of the two drive sources are combinable via a planetary gear set P, wherein a planet carrier of the planetary gear set P is connected to a pump drive shaft of the pump LVP. Further, a sun gear of the planetary gear set P is connected to the electric motor EM. Additionally, a ring gear of the planetary gear set P is drivable by the first drive source VM, 202. For this purpose, an external gearing is arranged on the ring gear, wherein a gearwheel connected to the first drive source VM, 202 intermeshes with this external gearing. Multiple planet gears are rotatably mounted on the planet carrier. The planet gears intermesh with the sun gear and with the ring gear.

The pump LVP is delivers oil to the hydraulic control unit 10 according to demand, wherein the demand is determined by a control unit ECU. The demand is determined by calculating a drive parameter, to be made available, for at least one of the two drive sources VM, EM; 202 using the control unit ECU and outputting the determined drive parameter as a specified value for controlling at least one of the two drive sources VM, EM; 202. The oil is distributed according to demand in the primary oil supply circuit 1 and the secondary oil supply circuit 2, wherein the primary oil supply circuit 1 is prioritized, as described above. If there is an excess amount of oil remaining, the excess amount of oil is returned to the pump LVP via a suction charging 4.

Figure 2:
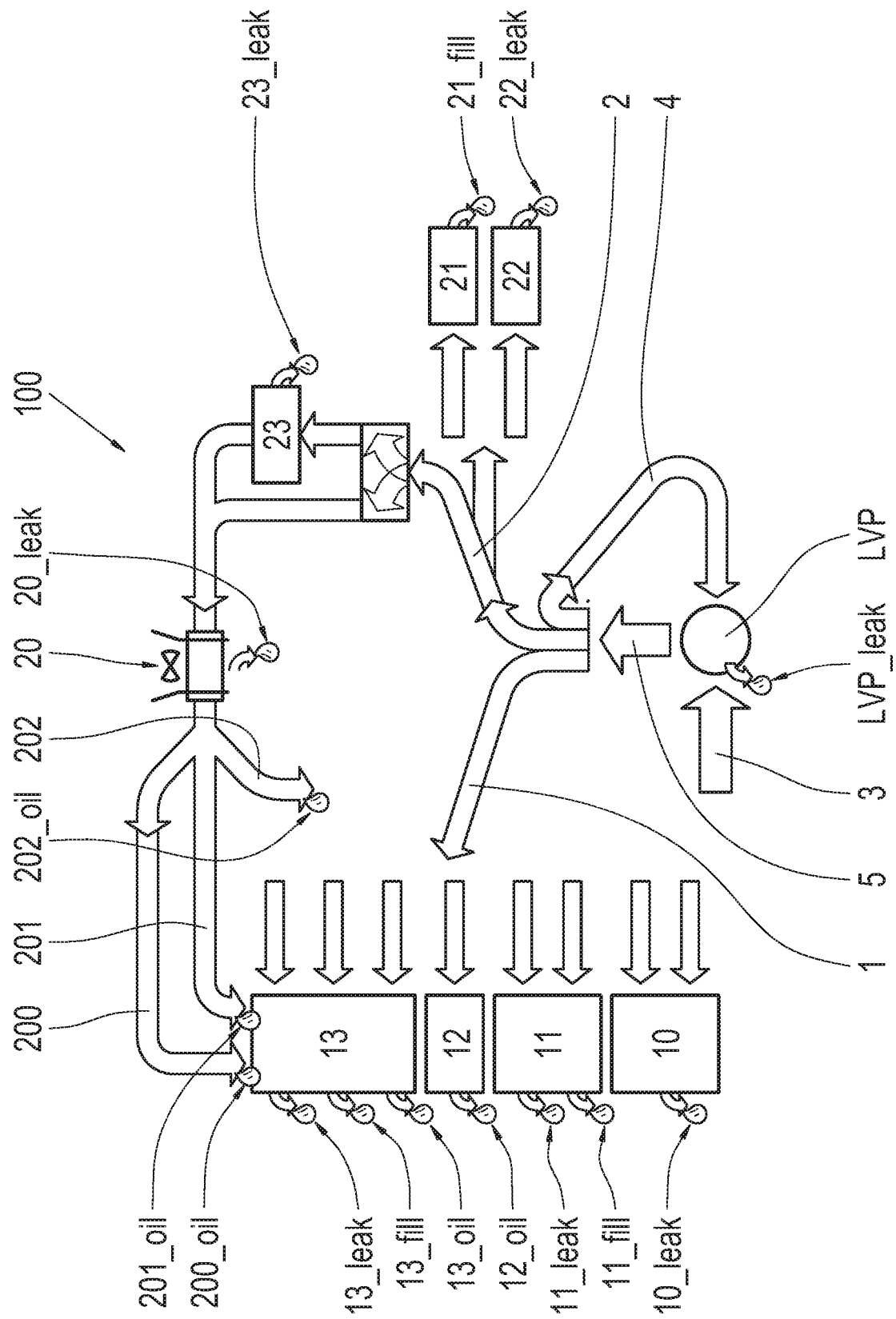
FIG. 2 shows a schematic view of the distribution of oil to consumers in the oil supply system according to one embodiment of the present invention.

The distribution of the oil to the consumers in the oil supply system 100 as shown in FIG. 1 for a vehicle transmission G is represented in a schematic manner in FIG. 2. The oil delivered by the pump LVP is fed to the hydraulic control unit 10. The hydraulic control unit 10 is utilized for distributing the flow of the oil to different circuits, particularly, to the primary oil supply circuit 1 and the secondary oil supply circuit 2, wherein excess oil is returned to the pump LVP via the suction charging 4. Oil is made available to the pump LVP via the suction intake 3. In addition, the pump LVP is also connected to the control unit ECU, as shown in FIG. 1, which is the transmission control unit or a control unit associated with the second drive source EM. The control unit ECU is utilized for the open-loop control of further functionalities of the transmission G and receives data and signals from highly diverse components, i.e., also from the consumers in the primary oil supply circuit 1 and from the consumers in the secondary oil supply circuit 2, which are appropriately monitored. Furthermore, the control unit ECU processes the data and output control and/or regulating signals to appropriate devices, such as the pump LVP and the drive sources VM, EM; 202, to be carried out.

The drive sources VM, EM; 202 therefore receive a signal, which, for example, specifies the rotational speed and/or the torque to be set, so that, as a result, the pump LVP pumps a desired flow into the oil supply circuit(s) 1, 2. The distribution or branching is controlled by a prioritization valve 5 in the hydraulic control unit (HCU) 10, as shown in FIG. 2. This ensures that the primary oil supply circuit 1 is first supplied with a necessary flow of oil that has been calculated in the control unit ECU. Only when the necessary flow has been supplied to the primary oil supply circuit 1 is a flow supplied to the secondary oil supply circuit 2. As described above, an excess flow of oil is fed back to the pump LVP via the suction charging 4.

The primary oil supply circuit 1 is a hydraulic circuit in which a hydraulic control unit or HCU 10, as a consumer of oil, is provided and at which the overall system pressure is applied. In addition, a parking lock 11, a torque converter 12, and all clutches 13 present in the system, including the TCC (torque converter clutch) and a possibly present separating clutch for decoupling the internal combustion engine VM from the transmission G, are consumers in the primary oil supply circuit 1 and/or the hydraulic circuit. The individual consumers 10, 11, 12, 13 have permanent leaks, which arise, for example, through annular gaps in valves, as described above. The individual consumers 10, 11, 12, 13 additionally have situational demands for oil, for example, due to a demand for pre-filling, filling, a movement of an actuator, etc. The demands associated with the consumers 10, 11, 12, 13 are briefly explained in the following.

The HCU 10 has a permanent leak 10_leak due to the applied system pressure and/or the current temperature and the current pressure.

The parking lock 11 mainly has a situational demand due to the filling demand during movement of the cylinder 11_fill and due to a leakage flow of the parking lock actuator 11_leak.

The torque converter 12 also mainly has a situational demand due to oil flow at the flow valve primarily when a converter clutch 12_oil is disengaged.

The clutch-related demands of the clutches 13 are a leakage flow 13_leak, a demand to fill the clutch(es) 13_fill, and an oil demand 13_oil, which results from the capacity of the clutch(es) 13 due to their elasticity.

The secondary oil supply circuit 2 has pressure conditions other than those in the primary oil supply circuit 1. The secondary oil supply circuit 2 is essentially a cooling and lubrication circuit in which, as consumers of oil, secondary oil demands of the HCU 10, which are subjected to other pressure conditions, are also handled. For example, a pre-filling demand of the clutches 21_fill and a leakage at a temperature measurement point 22_leak are handled in the secondary oil supply circuit 2.

In addition, the secondary oil supply circuit 2 supplies a cooling unit 20 oil either directly or the oil is additionally conducted via a converter cooling system 23 to the cooling unit 20 for cooling the torque converter 12. The cooling unit 20 as well as the converter cooling system 23, as consumers, each have a flow requirement of oil and a certain leakage 20_leak, 23_leak, which are to be taken into account in the calculation of the overall demand. The oil flow cooled by the cooling unit 20 is utilized for cooling the electric motor 202 of the transmission G, which also has an oil demand 202_oil. The cooled oil flow is also usable, however, for a passive clutch cooling 201 having oil demand 201_oil in order to pre-fill the clutches, wherein a cooling and lubrication of the gear set is also provided by the passive clutch cooling 201. The cooled oil flow is also usable, however, for (active) clutch cooling 200 of the clutch(es) having a corresponding oil demand 200_oil in order to pre-fill the clutches.

All oil demands and leakages of the consumers 10-13; 20-23; 200; 201 arising from the primary oil supply circuit 1 as well as from the secondary oil supply circuit 2, and from the pump LVP are processed in the transmission control unit and/or the control unit ECU and, there, a necessary flow for the (overall) system is determined. The necessary flow is then distributed, according to demand, to the consumers 10-13; 20-23; 200; 201 and, if necessary, the pump LVP, wherein the primary oil supply circuit 1 is prioritized. Advantageously, the demand for as many consumers as possible 10-13; 20-23; 200; 201 is predicted at as many points in time as possible, in order to avoid an undersaturation or undersupply and, therefore, a potential risk of damage of the consumers 10-13; 20-23; 200; 201 and a reduction of comfort are avoided.

By supplying a slightly higher flow than is calculated by the control unit ECU, i.e., for example, the transmission control unit, a rising pressure and/or demand due to a higher flow requirement, for example, due to a shift request, are satisfied faster and a risk of an undersaturation or undersupply of the oil supply circuit, in particular of the primary oil supply circuit 1, is avoided.

Therefore, due to the actuation of the pump LVP according to demand, a previously existing power loss is minimized and, therefore, the efficiency of the system is increased without risking an undersaturation or undersupply. This is made possible due to the determination of the flow requirement of the overall system based on the flow requirement of every individual consumer 10-13; 20-23; 200; 201 and, if necessary, the pump LVP at every given point in time, i.e., at certain query intervals.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

LIST OF REFERENCE SIGNS 1 primary oil supply circuit
10 hydraulic control unit (HCU)
10_leak permanent oil demand due to the current system pressure
11 parking lock system
11_fill demand due to the filling demand during the movement of the cylinder
11_leak leakage flow of the parking lock actuator
12 torque converter
12_oil oil flow at the flow valve with disengaged converter clutch
13 clutch components
13_oil oil demand resulting from the capacity of the clutch (es)
13_fill demand for filling the clutch(es)
13_leak leakage flow of the clutches
2 secondary oil supply circuit
20 cooling unit
20_leak flow requirement of oil and/or leakage
200 cooling of the clutches
201 passive cooling of the clutches (and of the gear set)
202 electric motor, drive source
21 pre-filling devices
21_fill pre-filling demand of the clutches
22 secondary leaks of the control unit
22_leak leakage at a temperature measurement point
23 converter cooling system
23_leak flow requirement of oil and/or leakage
3 suction intake of the pump
4 suction charging
5 prioritization valve
LVP power-split pump
ECU control unit
P planetary gear set
G vehicle transmission
EM, VM, drive sources

The invention claimed is:

1. A method for supplying consumers of an oil supply system (100) for a vehicle transmission (G) with oil, wherein the oil supply system (100) comprises a pump (LVP) drivable by two drive sources (VM, EM, 202), the oil supply system (100) further comprising a hydraulic control unit (10) including multiple control valves for distributing the oil to the consumers (10-13), the method comprising:

determining, with a control unit (ECU), an overall oil flow requirement in the oil supply system (100);

determining, with the control unit (ECU), an oil flow requirement of consumers (10-13) in an oil supply circuit of the vehicle transmission (G);

calculating, with the control unit (ECU), a drive parameter for at least one of the two drive sources (VM, EM, 202) of the pump (LVP) based at least in part on the overall oil flow requirement and the oil flow requirement of the consumers (10-13); and outputting, with the control unit (ECU), the drive parameter as a specified value for controlling the at least one of the two drive sources (VM, EM, 202) to deliver the oil to the hydraulic control unit (10), wherein the drive power of the two drive sources (VM, EM, 202) are combined by a planetary gear set (P), an element of the planetary gear set being connected to a pump drive shaft of the pump (LVP).

2. The method of claim 1, wherein the drive parameter represents an available power, an available rotational speed, or an available torque of the at least one of the two drive sources (VM, EM, 202).

3. The method of claim 1, wherein the oil supply circuit comprises a primary oil supply circuit (1) and a secondary oil supply circuit (2), wherein first consumers (10-13) of the consumers are in the primary oil supply circuit (1), the first consumers (10-13) having a first oil flow requirement and comprising at least one of the hydraulic control unit (10), a parking lock system (11), a torque converter (12), or clutches (13).

4. The method of claim 3, wherein second consumers of the consumers (201; 202; 21; 22; 23) are in the secondary oil supply circuit (2), the second consumers (201; 202; 21; 22; 23) having a second oil flow requirement, the second oil flow requirement being determined.

5. The method of claim 4, wherein the second consumers (201; 202; 21; 22; 23) comprise at least one of a cooling unit (20), an active cooling of at least one of clutch (200), a passive cooling (201) of the at least one clutch, a cooling of an electric motor (202) of the vehicle transmission (G), a cooling of the torque converter (23), or secondary oil demands of the hydraulic control unit (10), the secondary oil demands comprising a clutch pre-filling device (21) and a temperature measurement point (22).

6. The method of claim 1, wherein the oil flow requirement of the consumers (10-13) in the oil supply circuit consists of a permanent demand of the consumers (10-13; 200-202; 21-23) and a situational demand of the consumers (10-13; 200-202; 21-23), the permanent and situational demands depending on the current condition of the vehicle transmission (G).

7. The method of claim 1, wherein the drive parameter is output as an input speed of the pump (LVP).

8. The method of claim 7, further comprising calculating, with the control unit (ECU), the necessary torque for the at least one of the two drive sources (VM, EM, 2020) of the pump (LVP), the necessary torque being a pre-control variable for the input speed.

9. The method of claim 1, further comprising adding a predefined flow to at least the overall oil flow requirement, the drive parameter being calculated based at least in part on the predefined flow.

10. The method of claim 1, wherein the control unit (ECU) predictively determines at least the overall oil flow requirement.

11. The method of claim 10, wherein, when an increase in necessary flow rate is required due to an unpredicted request to change a functionality, the functionality is changed only when an oil supply required for the change is available.

12. The method of claim 1, further comprising determining a leakage (LVP_leak) of the pump (LVP), the drive parameter being calculated based at least in part on the leakage (LVP_leak) of the pump (LVP).

13. An oil supply system (100) for supplying consumers (10-13; 200-202; 21-23; LVP) in a vehicle transmission (G), the system (100) comprising the control unit (ECU) configured for carrying out the method of claim 1.

14. The oil supply system (100) of claim 13, wherein the control unit (ECU):
   a) is a transmission control unit, the transmission control unit being configured for the open-loop or closed-loop control of functions of the transmission (G); or
   b) is a control device of one of the two drive sources (202).

15. A vehicle transmission (G) for a motor vehicle drive train, the transmission (G) comprising the oil supply system (100) of claim 13.

16. A method for supplying consumers of an oil supply system (100) for a vehicle transmission (G) with oil, wherein the oil supply system (100) comprises a pump (LVP) drivable by two drive sources (VM, EM, 202), the oil supply system (100) further comprising a hydraulic control unit (10) including multiple control valves for distributing the oil to the consumers (10-13), the method comprising:

determining, with the control unit (ECU), an oil flow requirement of consumers (10-13) in an oil supply circuit of the vehicle transmission (G);

determining, with a control unit (ECU), an overall oil flow requirement in the oil supply system (100) based at least in part on the oil flow requirement of the consumers (10-13);

calculating, with the control unit (ECU), a drive parameter for at least one of the two drive sources (VM, EM, 202) of the pump (LVP) based at least in part on the overall oil flow requirement; and outputting, with the control unit (ECU), the drive parameter as a specified value for controlling the at least one of the two drive sources (VM, EM, 202) to deliver the oil to the hydraulic control unit (10), wherein the drive power of the two drive sources (VM, EM, 202) are combined by a planetary gear set (P), an element of the planetary gear set being connected to a pump drive shaft of the pump (LVP).

* * * * *